(12) United States Patent
Han et al.

(10) Patent No.: US 12,331,674 B1
(45) Date of Patent: Jun. 17, 2025

(54) WATER SUPPLY MODULE

(71) Applicant: Hanon Systems, Daejeon (KR)

(72) Inventors: Jeong Wan Han, Daejeon (KR); Hyuk Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/707,071

(22) PCT Filed: Nov. 17, 2022

(86) PCT No.: PCT/KR2022/018228
§ 371 (c)(1),
(2) Date: May 2, 2024

(87) PCT Pub. No.: WO2023/090907
PCT Pub. Date: May 25, 2023

(30) Foreign Application Priority Data

Nov. 19, 2021 (KR) .................. 10-2021-0159996
Nov. 16, 2022 (KR) .................. 10-2022-0153262

(51) Int. Cl.
*F01P 11/04* (2006.01)
*F01P 5/10* (2006.01)
(Continued)

(52) U.S. Cl.
CPC ................ *F01P 5/10* (2013.01); *F01P 7/16* (2013.01); *F01P 11/029* (2013.01); *F01P 2007/146* (2013.01)

(58) Field of Classification Search
CPC ........ F01P 5/10; F01P 7/14; F01P 3/20; F01P 2007/146; F01P 7/165; F01P 3/18;
(Continued)

(56) References Cited

U.S. PATENT DOCUMENTS

2015/0345368 A1* 12/2015 Le Poul ............ B65D 51/1644
123/41.51
2021/0219466 A1* 7/2021 Kim .................... H01M 10/613

FOREIGN PATENT DOCUMENTS

CN 212979863 U * 4/2021 ............ F01P 11/029
DE 102020117643 A1 * 7/2021 ............... B60K 1/00
(Continued)

*Primary Examiner* — Lindsay M Low
*Assistant Examiner* — Teuta B Holbrook
(74) *Attorney, Agent, or Firm* — NORTON ROSE FULBRIGHT US LLP (57) ABSTRACT

The present invention relates to a water supply module including a coolant module including a reservoir tank configured to accommodate a coolant therein, a direction switching valve configured to control a flow of a coolant in a plurality of directions, and a coolant pump configured to pump the coolant, and a component assembling part to which the coolant module is configured to be coupled, the component assembling part having a vehicle mounting portion formed to be coupled to a vehicle, and a coolant flow path in which the coolant flows, such that the components for the thermal management may be connected in an integrated manner, thereby reducing the number of components and the number of working processes, improving the mounting convenience by means of modularization, reducing a load of a water pump, and improving expandability in coupling the components.

21 Claims, 7 Drawing Sheets

(51) Int. Cl.
*F01P 7/16* (2006.01)
*F01P 11/02* (2006.01)
*F01P 7/14* (2006.01)

(58) Field of Classification Search
CPC .................. F01P 2003/185; F01P 2003/187;
F01P 3/00; H01M 10/625; H01M 10/60;
H01M 10/613
USPC .................. 165/41, 42, 51, 80.5, 80.4, 80.1;
123/41.01, 41.44
See application file for complete search history.

(56) References Cited

FOREIGN PATENT DOCUMENTS

| KR | 101765578 B1 | 8/2017 |
| KR | 10-2020-0139091 A | 12/2020 |
| KR | 102189058 B1 | 12/2020 |
| KR | 20200139091 A * | 12/2020 |
| KR | 20200139093 A * | 12/2020 |
| KR | 10-2021-0015223 A | 2/2021 |
| KR | 10-2021-0091897 A | 7/2021 |

* cited by examiner

PRIOR ART

WATER SUPPLY MODULE

CROSS REFERENCE TO RELATED APPLICATIONS

This application is a national phase under 35 U.S.C. § 371 of International Application No. PCT/KR2022/018228 filed on Nov. 17, 2022, which claims the benefit of priority from Korean Patent Application Nos. 10-2022-0153262 filed on Nov. 16, 2022 and 10-2021-0159996 filed on Nov. 19, 2021. The entire contents of these applications are incorporated herein by reference in their entirety.

TECHNICAL FIELD

The present invention relates to a water supply module capable of integrating and connecting various components configured to cool and heat electrical components in an environmental-friendly vehicle.

BACKGROUND ART

Recently, there has been a need to develop environmental-friendly vehicles, which may be substantially substituted for internal combustion engine vehicles, in order to improve energy efficiency and cope with environmental pollution.

The environmental-friendly vehicles broadly include an electric or hydrogen vehicle that uses a battery or a fuel cell as an energy source, and a hybrid vehicle that operates by using an engine and a battery. The environmental-friendly vehicle includes an engine cooling system configured to manage a process of cooling and heating the engine, and an electrical component cooling system configured to manage heat of electrical components such as an electric motor.

The electrical component cooling system mainly cools an electrical component, an actuator, an HSG (hybrid start and generator), and the like by using a coolant. The electrical component is structured to heat the battery in cold weather by allowing the coolant to bypass a radiator through a bypass circuit and allowing waste heat of a PE component (power electronics) to pass through the battery.

The electrical component cooling system of the environmental-friendly vehicle needs to satisfy various uses such as heating, cooling, and waste heat recovery from a plurality of components. However, because of a limitation in layout space in the vehicle, there may occur problems in that difficulty in disposing the components, designing a hose route, and connecting the components and the hose increases, a large number of processes are required to mount and connect the components and the hose individually in order to mount the components in the vehicle, flow resistance increases at the coolant side because of a complicated route, and a high load is applied to a water pump.

DOCUMENT OF RELATED ART

Patent Document

KR 10-1765578 B1 (published on Jul. 10, 2012)

DISCLOSURE

Technical Problem

The present invention has been made in an effort to solve the above-mentioned problem, and an object of the present invention is to provide a water supply module capable of connecting components of a cooling system in an integrated manner, thereby reducing the number of components and the number of working processes, improving mounting convenience by means of modularization, reducing a load of a water pump, and improving expandability in coupling the components.

Technical Solution

In order to achieve the above-mentioned object, the present invention provides a water supply module including: a coolant module including a reservoir tank configured to accommodate a coolant therein, a direction switching valve configured to control a flow of a coolant in a plurality of directions, and a coolant pump configured to pump the coolant; and a component assembling part to which the coolant module is configured to be coupled, the component assembling part having a vehicle mounting portion formed to be coupled to a vehicle, and a coolant flow path in which the coolant flows.

In addition, the direction switching valve and the coolant pump may be configured as a single assembly, and the component assembling part may have a mounting portion to which the reservoir tank is coupled, and a mounting portion to which the assembly of the direction switching valve and the coolant pump is coupled.

In addition, the water supply module may further include one or more heat exchangers, and the component assembling part may have a mounting portion to which the one or more heat exchangers are coupled.

In addition, the component assembling part may have a plurality of coolant ports assembled to the heat exchanger so that the coolant flows between the component assembling part and the heat exchanger.

In addition, the water supply module may further include a controller connected to the direction switching valve and configured to control an operation of the direction switching valve.

In addition, the reservoir tank may be disposed above the component assembling part based on a gravitational direction, and the vehicle mounting portion may be disposed below the component assembling part based on the gravitational direction.

In addition, the component assembling part may have a reservoir tank accommodation space in which the reservoir tank is seated, and a coolant pump accommodation space in which the coolant pump is seated.

In addition, the component assembling part may include: a first flat plate portion having the vehicle mounting portion; and a second flat plate portion protruding from the first flat plate portion.

In addition, the water supply module may further include one or more heat exchangers, and the heat exchanger may be disposed opposite to the direction switching valve and the coolant pump based on the second flat plate portion.

In addition, the component assembling part may have a first coolant flow path connected to a first-first port through a first connection flow path so that a first coolant flows through the first coolant flow path, and the component assembling part may have a second coolant flow path connected to a second-first port through a second connection flow path so that a second coolant flows through the second coolant flow path.

In addition, imaginary planes defined by the first and second flat plate portions may traverse the first and second coolant flow paths.

In addition, the present invention provides a water supply module including: a component assembling part having a first mounting portion, a second mounting portion, a third mounting portion, and a vehicle mounting portion and having a coolant flow path in which a coolant flows; a reservoir tank configured to accommodate the coolant therein and coupled to the first mounting portion; a heat exchanger having a coolant flow path, in which the coolant flows, and connected to the coolant flow path of the component assembling part, the heat exchanger being coupled to the second mounting portion and having a refrigerant flow path configured to exchange heat with the coolant flow path; and a direction switching valve connected to a coolant flow path of the reservoir tank and the coolant flow path of the heat exchanger, coupled to the third mounting portion, and configured to control a flow of the coolant in a plurality of directions.

In addition, the first mounting portion, the second mounting portion, the third mounting portion, the vehicle mounting portion, and the coolant flow path of the component assembling part may be integrally formed by injection molding.

In addition, the first mounting portion may be formed at an upper side of the component assembling part, the vehicle mounting portion may be formed at a lower side of the component assembling part, the second mounting portion may be formed at a rear side of the component assembling part, and the third mounting portion may be formed at a front side of the component assembling part.

In addition, the component assembling part may have a through-groove formed through a partial region corresponding to a position on the heat exchanger and a position on the direction switching valve that face each other.

In addition, the reservoir tank may have first and second accommodation portions in which first and second coolants having different temperatures are separately accommodated, the component assembling part may have coolant flow paths through which the first and second coolants flow, the heat exchanger may have coolant flow paths through which the first and second coolants flow, and the direction switching valve may be configured to control flows of the first and second coolants in the plurality of directions.

In addition, the first and second coolants may be configured to flow separately from being mixed with each other.

In addition, the water supply module may further include: a first coolant pump integrally mounted on the direction switching valve and configured to pump the first coolant; and a second coolant pump configured to pump the second coolant.

In addition, first and second accommodation portions of the reservoir tank may be connected to the direction switching valve, first and second coolant flow paths of the heat exchanger may be connected to the direction switching valve, and first and second coolant flow paths of the heat exchanger may be connected to the coolant flow paths of the component assembling part.

In addition, the direction switching valve may have a first coolant discharge port from which the first coolant is discharged, and a second coolant discharge port from which the second coolant is discharged.

In addition, a first coolant flow path of the component assembling part may have a first-first port connected to the first coolant flow path of the heat exchanger, and a first-second port and a first-third port configured to communicate with the first-first port, and a second coolant flow path of the component assembling part may have a second-first port connected to the second coolant flow path of the heat exchanger, and a second-second port and a second-third port configured to communicate with the second-first port.

Advantageous Effects

According to the water supply module of the present invention, the components may be integrated, and a hose or connection pipe may be eliminated, or a length of a pipe may be shortened, such that the water supply module may decrease in size and weight.

In addition, the number of components and the number of assembling processes may be reduced, the mounting convenience may be improved, and the performance, durability, and quality of the thermal management system may be improved.

In addition, it is possible to reduce the coolant flow resistance, thereby reducing the load applied to the water pump.

MODE FOR INVENTION

Hereinafter, a water supply module of the present invention configured as described above will be described in detail with reference to the accompanying drawings.

Figure 1:
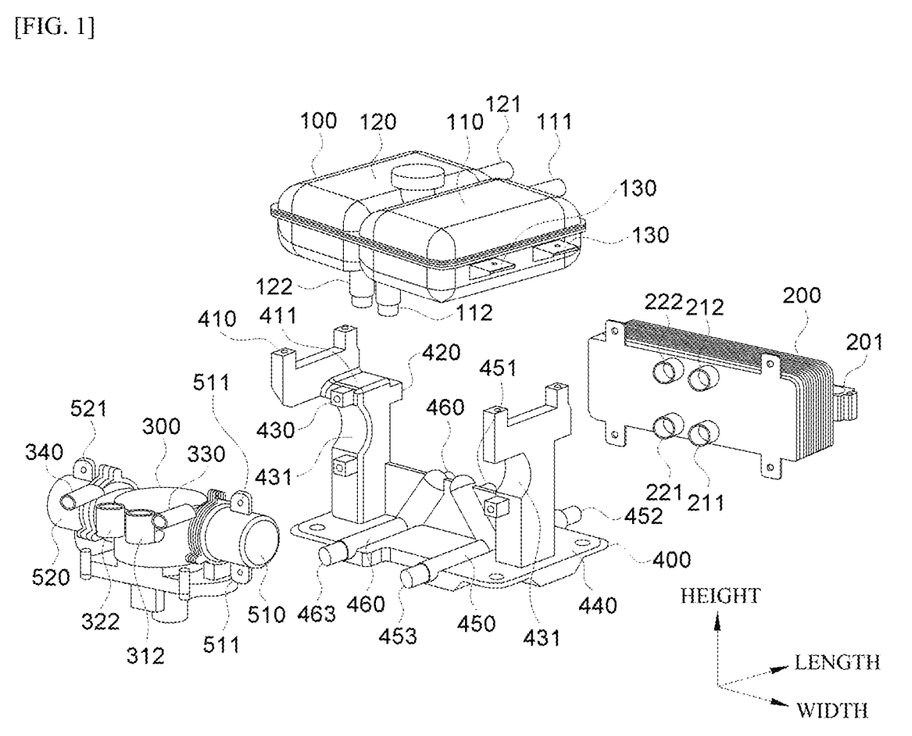
FIGS. 1 to 3 are an exploded perspective view and assembled perspective views illustrating a water supply module according to an embodiment of the present invention.
Figure 2:
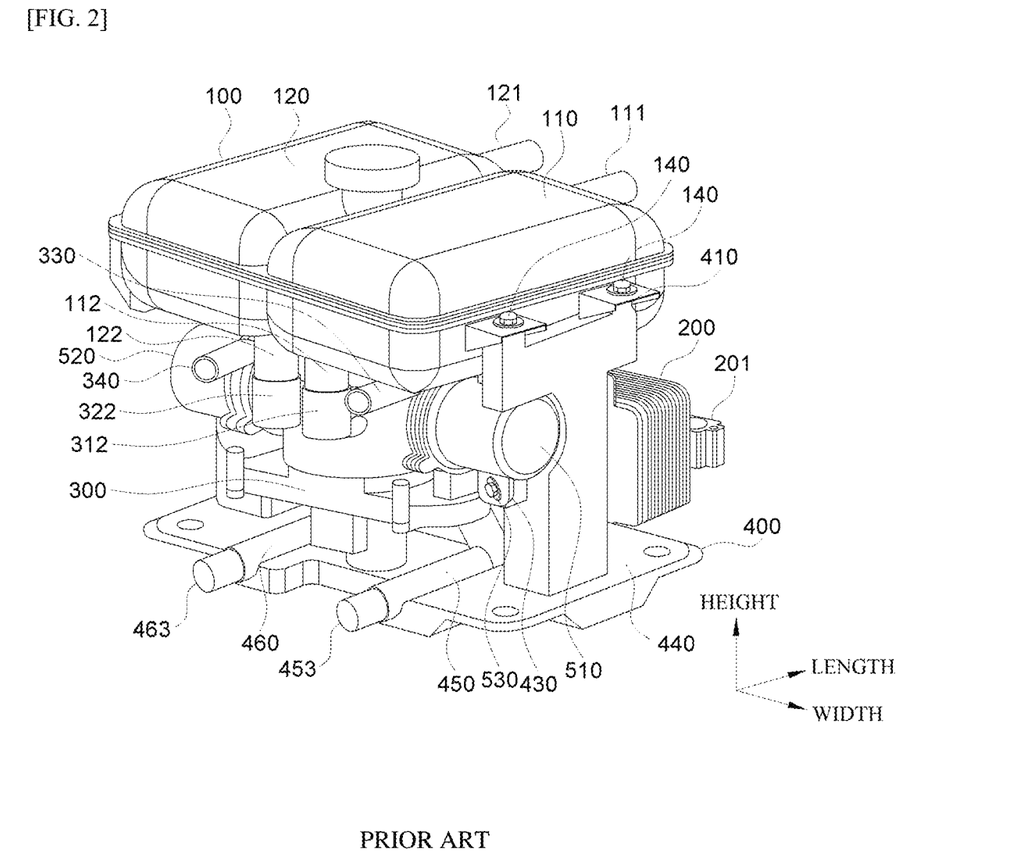
Figure 3:
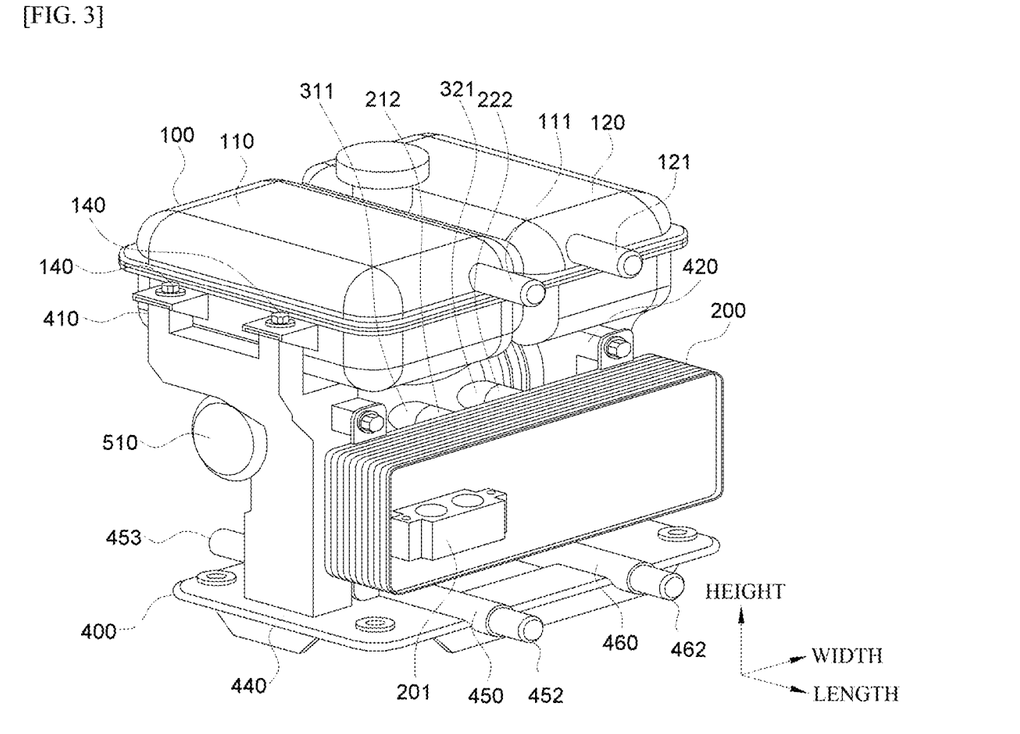
Figure 4:
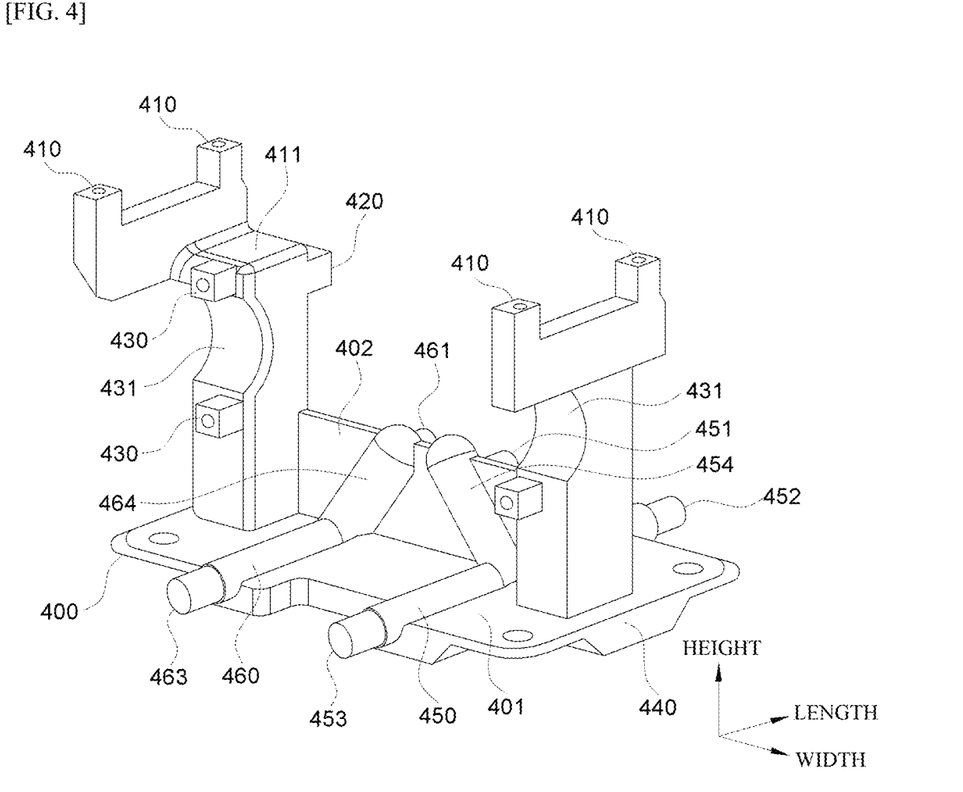
FIGS. 4 and 5 are front and rear perspective views illustrating a component assembling part of the water supply module according to the embodiment of the present invention.
Figure 5:
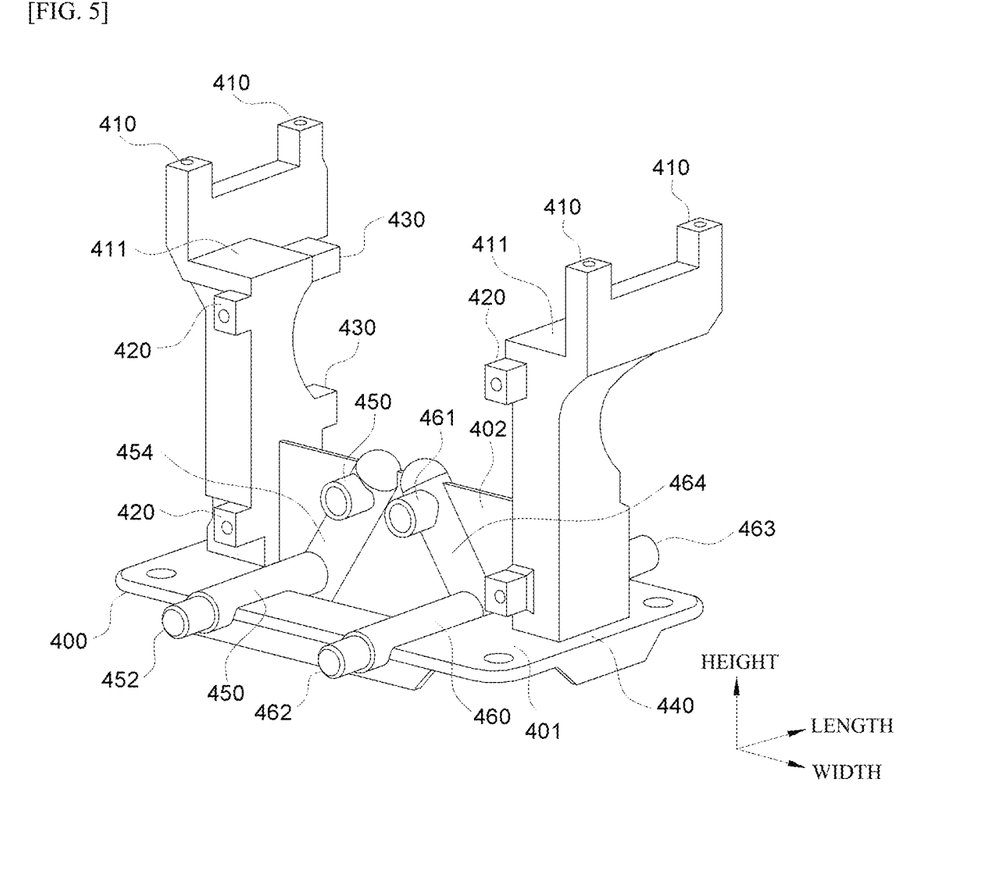

FIGS. 1 to 3 are an exploded perspective view and assembled perspective views illustrating a water supply module according to an embodiment of the present invention, and FIGS. 4 and 5 are front and rear perspective views illustrating a component assembling part of the water supply module according to the embodiment of the present invention.

As illustrated, the water supply module according to the embodiment of the present invention may broadly include a coolant module including a reservoir tank 100, a direction switching valve 300, and coolant pump, and a component assembling part 400. Further, the water supply module of the present invention may further include a heat exchanger 200 and a controller.

The reservoir tank 100 may serve to store and supply first and second coolants flowing along different routes and be configured to prevent the first and second coolants from being mixed with each other. Further, the first and second coolants may have different temperatures. For example, the reservoir tank 100 may be formed in a shape in which a partition wall is provided in a container having an empty space for accommodating the coolants therein, and the partition wall divides an internal space of the container. Therefore, a first accommodation portion 110 for accommodating the first coolant and a second accommodation portion 120 for accommodating the second coolant may be integrated in the reservoir tank 100. In addition, the reservoir tank may have various shapes. Further, a first coolant inlet 111, into which the first coolant is introduced, and a second coolant inlet 121, into which the second coolant is introduced, may be formed at a rear side of the reservoir tank 100, i.e., one side based on a longitudinal direction. In addition, a first coolant outlet 112, from which the first coolant is discharged, and a second coolant outlet 122, from which the second coolant is discharged, may be formed at a front side of the reservoir tank 100, i.e., the other side based on the longitudinal direction. In this case, the first and second coolant outlets 112 and 122 may each be provided in the form of a pipe protruding downward from a lower surface of the reservoir tank 100, and the first coolant outlet 112 and the second coolant outlet 122 may be formed in parallel with each other. In addition, a plurality of fastening portions 130 may protrude from two opposite lateral sides of the reservoir tank 100 based on a width direction and be fixedly coupled to the component assembling part 400. The plurality of fastening portions 130 may be symmetrically formed at two opposite sides based on the width direction. Further, a fastening hole, which is formed through two opposite surfaces of the fastening portion 130 in a height direction, may be formed in the fastening portion 130. A fastening member 140, such as a bolt, may be coupled to the fastening hole.

The direction switching valve 300 may be a 6-way valve capable of controlling a flow of the coolant therein in six directions and may variously control the flows of first and second coolants in response to an operation of the direction switching valve. For example, the direction switching valve 300 may include a casing, and a valve main body provided in the casing. Four coolant inlets and two coolant outlets may be formed in the direction switching valve 300. A first-first coolant inlet 311, into which the first coolant is introduced, and a second-first coolant inlet 321, into which the second coolant is introduced, may be formed at a rear side of the direction switching valve 300, i.e., one side based on the longitudinal direction. In this case, the first-first coolant inlet 311 and the second-first coolant inlet 321 may each be provided in the form of a pipe protruding rearward from the rear side. Further, a first-second coolant inlet 312, into which the first coolant is introduced, and a second-second coolant inlet 322, into which the second coolant is introduced, may be formed at a front side of the direction switching valve 300, i.e., the other side based on the longitudinal direction. In addition, a first coolant discharge port 330, from which the first coolant is discharged, and a second coolant discharge port 340, from which the second coolant is discharged, may be formed at the front side of the direction switching valve 300. The first coolant discharge port 330 and the second coolant discharge port 340 may protrude forward. Therefore, the flow of the first coolant and the flow of the second coolant may be controlled in a plurality of directions in response to the operation of the direction switching valve 300. In addition, a first coolant pump 510, which pumps the first coolant, and a second coolant pump 520, which pumps the second coolant, may be integrally mounted at the two opposite sides of the direction switching valve 300 based on the width direction.

The coolant pump may include the first coolant pump 510 and the second coolant pump 520. The first coolant pump 510 may be mounted at one side of the direction switching valve 300 based on the width direction and communicate with the direction switching valve 300. The second coolant pump 520 may be mounted at the other side of the direction switching valve 300 based on the width direction and communicate with the direction switching valve 300. The first coolant pump 510, the second coolant pump 520, and the direction switching valve 300 may be configured as a single assembly. A plurality of fastening portions 511 and 521 may protrude from the first and second coolant pumps 510 and 520 integrally mounted on the direction switching valve 300 and fixedly coupled to the component assembling part 400. Further, a fastening hole, which is formed through two opposite surfaces of each of the fastening portions 511 and 521, may be formed in each of the fastening portions 511 and 521 in the longitudinal direction. A fastening member 530, such as a bolt, may be coupled to the fastening hole. In this case, the plurality of fastening portions 511 may be symmetrically formed at two opposite sides of the first coolant pump 510 based on the height direction. The plurality of fastening portions 521 may be symmetrically formed at two opposite sides of the second coolant pump 520 based on the height direction. The plurality of fastening portions 511 of the first coolant pump 510 and the plurality of fastening portions 521 of the second coolant pump 520 may be symmetrically formed at two opposite sides based on the width direction. Therefore, the first and second coolant pumps 510 and 520 are coupled to the component assembling part 400, such that the direction switching valve 300 may be fixed to the component assembling part 400.

The component assembling part 400 may include a first flat plate portion 401 and a second flat plate portion 402. The second flat plate portion 402 may extend and protrude from the first flat plate portion 401. Further, first mounting portions 410, second mounting portions 420, third mounting portions 430, and vehicle mounting portions 440 may be integrated formed on the component assembling part 400. A first coolant flow path 450, in which the first coolant flows, and a second coolant flow path 460, in which the second coolant flows, may be further integrally formed in the component assembling part 400. Therefore, the component assembling part 400 may be provided in the form of a bracket on which the components are mounted. The coolant flow paths may be integrally formed in the component assembling part 400. For example, the first flat plate portion 401, the second flat plate portion 402, the first mounting portion 410, the second mounting portion 420, the third mounting portion 430, the vehicle mounting portion 440, the first coolant flow path 450, and the second coolant flow path 460 may be integrally formed on the component assembling part 400 by injection molding. Further, the first mounting portions 410 may be formed at an upper side of the component assembling part 400 based on the height direction. The vehicle mounting portions 440 may be formed at a lower side of the component assembling part 400 based on the height direction so that the component assembling part 400 is coupled to a vehicle. In this case, a damper made of rubber may be provided on the vehicle mounting portion 440 and configured to prevent vibration from being transmitted to the vehicle. In addition, the second mounting portion 420 may be formed at a rear side of the component assembling part 400, i.e., one side based on the longitudinal direction, and the third mounting portion 430 may be formed at a front side of the component assembling part 400, i.e., the other side based on the longitudinal direction. Therefore, the reservoir tank 100 may be coupled to the first mounting portions 410, the heat exchanger 200 may be coupled to the second mounting portions 420, and the direction switching valve 300 may be coupled to the third mounting portions 430. In this case, concave reservoir tank accommodation spaces 411 may be formed to be adjacent to the first mounting portions 410 so that the reservoir tank 100 may be inserted and seated into the reservoir tank accommodation spaces 411. The reservoir tank accommodation spaces 411 may be formed to surround the two opposite lateral surfaces of the reservoir tank 100 based on the width direction and a bottom surface of the reservoir tank 100. Further, concave coolant pump accommodation spaces 431 may be formed to be adjacent to the second mounting portions 420 so that the first coolant pump 510 and the second coolant pump 520 may be inserted and seated into the coolant pump accommodation spaces 431. In addition, the reservoir tank accommodation spaces 411 may be formed to correspond to a shape of the reservoir tank 100, and the coolant pump accommodation spaces 431 may be formed to correspond to shapes of the first and second coolant pumps 510 and 520. In addition, two opposite sides of each of the reservoir tank accommodation spaces 411 and two opposite sides of each of the coolant pump accommodation spaces 431 may be symmetrically formed in the width direction. Further, coolant lines may be connected at the same time when the components are coupled to the component assembling part 400. Regarding the assembling order, the heat exchanger 200 may be assembled to the component assembling part 400 first, the direction switching valve 300, to which the first and second coolant pumps 510 and 520 are integrally assembled, is assembled to the component assembling part 400, and then the reservoir tank 100 may be finally assembled to the component assembling part 400. In addition, a through-groove may be formed through a partial region of the component assembling part 400 corresponding to a position on the heat exchanger 200 and a position on the direction switching valve 300 that face each other, such that a coolant line of the heat exchanger 200 and a coolant line of the direction switching valve 300 may be easily connected to each other through the through-groove. In addition, a first-first port 451, a first-second port 452, and a first-third port 453 may be formed in the component assembling part 400 and communicate with the first coolant flow path 450. A second-first port 461, a second-second port 462, and a second-third port 463 may be formed in the component assembling part 400 and communicate with the second coolant flow path 460. Further, the first coolant flow path 450 may include a first connection flow path 454. A flow path, which is formed in the first flat plate portion 401 in the longitudinal direction, is connected to the first-first port 451 through the first connection flow path 454 formed in the second flat plate portion 402, such that the first coolant may flow through the first coolant flow path 450. In addition, the second coolant flow path 460 may include a second connection flow path 464. A flow path, which is formed in the first flat plate portion 401 in the longitudinal direction, is connected to the second-first port 461 through the second connection flow path 464 formed in the second flat plate portion 402, such that the second coolant may flow through the second coolant flow path 460. In this case, imaginary planes defined by the first flat plate portion 401 and the second flat plate portion 402 may be defined to traverse the first coolant flow path 450 and the second coolant flow path 460. That is, the first coolant flow path 450 and the second coolant flow path 460 partially protrude from two opposite surfaces of the first flat plate portion 401 and two opposite surfaces of the second flat plate portion 402 instead of protruding from only one surface of the first flat plate portion 401 and only one surface of the second flat plate portion 402, such that a size of the entire package may be reduced. Therefore, the first coolant outlet 112 of the reservoir tank 100 may be connected to the first-second coolant inlet 312 of the direction switching valve 300, and the second coolant outlet 122 of the reservoir tank 100 may be connected to the second-second coolant inlet 322 of the direction switching valve 300. A first coolant inlet 211 of the heat exchanger 200 may be connected to the first-first port 451 of the component assembling part 400, and a second coolant inlet 221 of the heat exchanger 200 may be connected to the second-first port 461 of the component assembling part 400. A first coolant outlet 212 of the heat exchanger 200 may be connected to the first-first coolant inlet 311 of the direction switching valve 300, and a second coolant outlet 222 of the heat exchanger 200 may be connected to the second-first coolant inlet 321 of the direction switching valve 300. Further, the remaining non-connected coolant inlets or outlets may be connected to a power electronic (PE) component, a battery, a radiator, and the like.

For example, the heat exchanger 200 may be a chiller configured to transfer heat, which is generated by the PE component or the battery, i.e., the electrical component, to a refrigerant. The heat exchanger 200 may have a structure in which both the first and second coolants may exchange heat with the refrigerant. A first coolant flow path, through which the first coolant flows, and a second coolant flow path, through which the second coolant flows, may be separately formed in the heat exchanger 200. Further, the heat exchanger 200 may have the first coolant inlet 211 into which the first coolant is introduced, the first coolant outlet 212 from which the first coolant is discharged, the second coolant inlet 221 into which the second coolant is introduced, and the second coolant outlet 222 from which the second coolant is discharged. In this case, the first coolant inlet 211, the first coolant outlet 212, the second coolant inlet 221, and the second coolant outlet 222 may be disposed adjacent to one another and formed in parallel with one another while protruding forward from the front side, i.e., the other side based on the longitudinal direction. In addition, a refrigerant flow path, through which the refrigerant flows, may be formed in the heat exchanger 200 and disposed adjacent to the first and second coolant flow paths. The heat exchanger 200 may have a refrigerant inlet/outlet 201 configured to communicate with the refrigerant flow path so that the refrigerant is introduced into or discharged from the refrigerant inlet/outlet 201. In addition, fastening portions may protrude from two opposite sides of the heat exchanger 200 based on the width direction and be fixedly coupled to the component assembling part 400.

The controller may be connected to the direction switching valve 300 and control the operation of the direction switching valve 300. For example, the controller may be a PCB. The controller may be integrally provided in the direction switching valve 300. Alternatively, the controller may be separately provided outside the direction switching valve 300 and connected to the direction switching valve 300.

According to the present invention described above, the constituent components may be integrated, and a hose or connection pipe may be eliminated, or a length of a pipe may be shortened, such that the water supply module may decrease in size and weight. In addition, the number of constituent components and the number of assembling processes may be reduced, the mounting convenience may be improved, and the performance, durability, and quality of a thermal management system may be improved. In addition, it is possible to reduce the coolant flow resistance applied to the thermal management system using the water supply module, thereby reducing the load applied to the water pump.

In addition, in the water supply module of the present invention, the reservoir tank 100 may be disposed above the component assembling part 400 based on the gravitational direction, and the vehicle mounting portion 440 may be disposed below the component assembling part 400 based on the gravitational direction. Therefore, because the flow of the coolant may be formed in the direction from the upper side to the lower side by the gravity, such that the flow of the coolant may be smoothly formed, and the water supply module may be stably supported on a vehicle body of the vehicle.

Figure 6:
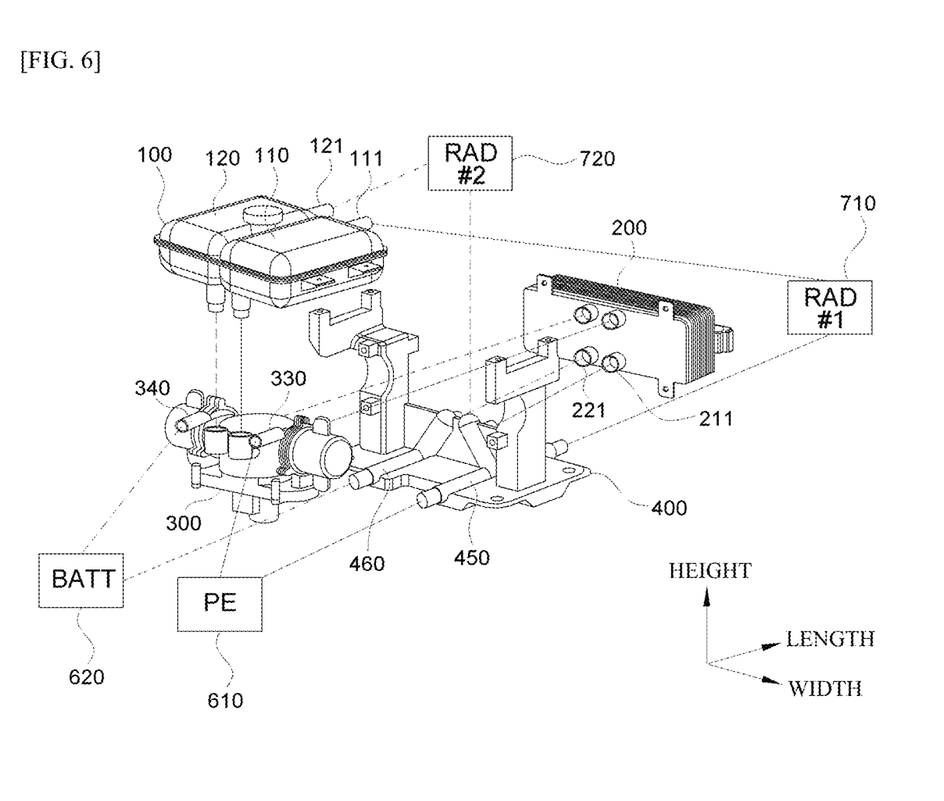
FIG. 6 is a configuration view illustrating a thermal management system including the water supply module according to the embodiment of the present invention.

FIG. 6 is a configuration view illustrating the thermal management system including the water supply module according to the embodiment of the present invention.

As illustrated, the thermal management system including the water supply module of the present invention may include the water supply module, a first thermal management target component 610, and a second thermal management target component 620 and further include a first heat radiator 710 and a second heat radiator 720.

For example, the first thermal management target component 610 may be the PE component, and the second thermal management target component 620 may be the battery. Further, the first heat radiator 710 and the second heat radiator 720 may be radiators.

The first thermal management target component 610 may have a coolant flow path through which the coolant may flow. Further, a coolant inlet of the first thermal management target component 610 may be connected to the first coolant discharge port 330 formed in the direction switching valve 300 of the water supply module, and a coolant outlet of the first thermal management target component 610 may be connected to the first-third port 453 of the first coolant flow path 450 formed in the component assembling part 400 of the water supply module.

The second thermal management target component 620 may have a coolant flow path through which the coolant may flow. Further, a coolant inlet of the second thermal management target component 620 may be connected to the second coolant discharge port 340 formed in the direction switching valve 300 of the water supply module, and a coolant outlet of the second thermal management target component 620 may be connected to the second-third port 463 of the second coolant flow path 460 formed in the component assembling part 400 of the water supply module.

A coolant inlet of the first heat radiator 710 may be connected to the first-second port 452 of the first coolant flow path 450 formed in the component assembling part 400 of the water supply module. Further, a coolant inlet of the second heat radiator 720 may be connected to the second-second port 462 of the second coolant flow path 460 formed in the component assembling part 400 of the water supply module.

In this case, the first thermal management target component 610 may be connected in parallel to the first heat radiator 710 and the first coolant flow path of the heat exchanger 200 through the first coolant flow path 450 of the component assembling part 400. The second thermal management target component 620 may be connected in parallel to the second heat radiator 720 and the second coolant flow path of the heat exchanger 200 through the second coolant flow path 460 of the component assembling part 400.

Therefore, under the control of the direction switching valve 300, the first coolant may cool the first thermal management target component 610 while circulating through the first coolant flow path of the heat exchanger 200 or cool the first thermal management target component 610 while circulating through the first heat radiator 710. Further, the second coolant may cool the second thermal management target component 620 while circulating through the second coolant flow path of the heat exchanger 200 or cool the second thermal management target component 620 while circulating through the second heat radiator 720.

Figure 7:
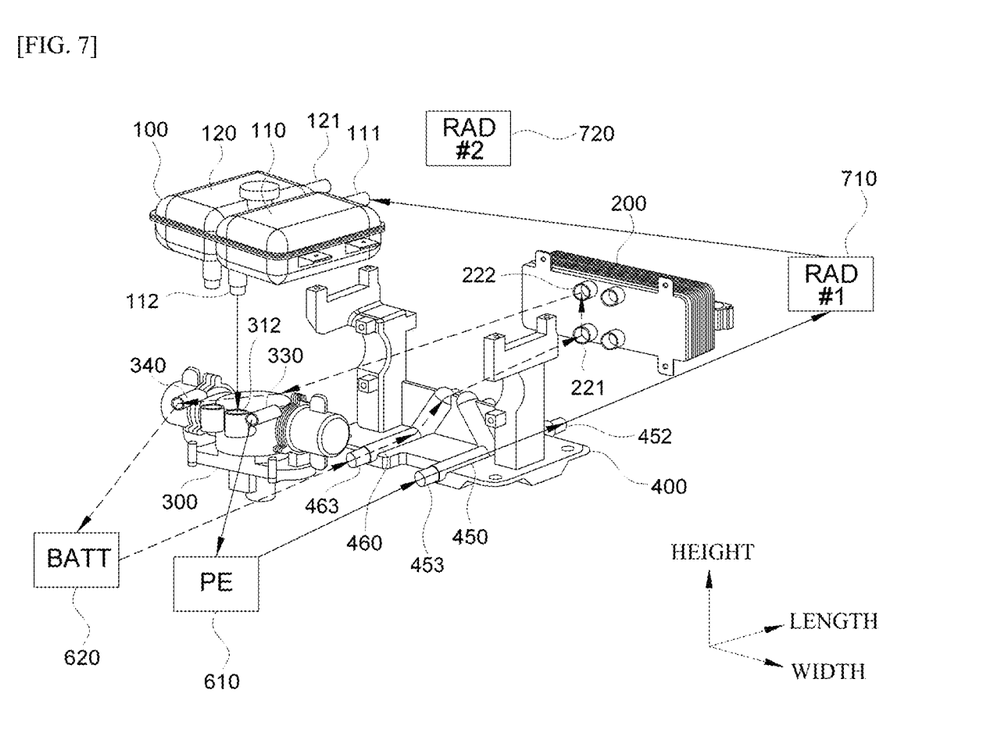
FIG. 7 is a view illustrating a flow of a coolant and illustrating one embodiment of an operating mode of the thermal management system including the water supply module according to the embodiment of the present invention.

FIG. 7 is a view illustrating a flow of the coolant and illustrating one embodiment of an operating mode of the thermal management system including the water supply module according to the embodiment of the present invention.

For example, as illustrated, in the thermal management system, the first thermal management target component 610 may be cooled in a cooling mode using the first heat radiator 710, and the second thermal management target component 620 may be cooled in a cooling mode using the heat exchanger 200. More specifically, the first coolant, which is heated while cooling the first thermal management target component 610, may be introduced into the first heat radiator 710 through the first coolant flow path 450 of the component assembling part 400, and the first coolant may be cooled in the first heat radiator 710. Thereafter, the first coolant may be introduced into the direction switching valve 300 through the first accommodation portion 110 of the reservoir tank 100, sent back to the first thermal management target component 610, and then circulated. Further, the second coolant, which is heated while cooling the second thermal management target component 620, may be introduced into the heat exchanger 200 through the second coolant flow path 460 of the component assembling part 400, and the second coolant may be cooled in the heat exchanger 200. Thereafter, the second coolant may be introduced into the direction switching valve 300, sent back to the second thermal management target component 620, and then circulated.

As described above, the direction switching valve may control the flow of the coolant, such that the thermal management target component may be selectively cooled by using the heat exchanger (chiller) or cooled by using the heat radiator depending on a temperature of the thermal management target component. Therefore, it is possible to easily cool the thermal management target components and more efficiently cool the thermal management target components.

The present invention is not limited to the above embodiments, and the scope of application is diverse. Of course, various modifications and implementations made by any person skilled in the art to which the present invention pertains without departing from the subject matter of the present invention claimed in the claims.

DESCRIPTION OF REFERENCE NUMERALS

100: Reservoir tank, 110: First accommodation portion,
111: First coolant inlet,
112: First coolant outlet, 120: Second accommodation portion,
121: Second coolant inlet, 122: Second coolant outlet,
130: Fastening portion, 140: Fastening member,
200: Heat exchanger, 201: Refrigerant inlet/outlet,
211: First coolant inlet, 212: First coolant outlet,
221: Second coolant inlet, 222: Second coolant outlet,
300: Direction switching valve, 311: First-first coolant inlet,
312: First-second coolant inlet, 321: Second-first coolant inlet,
322: Second-second coolant inlet, 330: First coolant discharge port,

340: Second coolant discharge port, 400: Component assembling part,
401: First flat plate portion, 402: Second flat plate portion, 410: First mounting portion,
411: Reservoir tank accommodation space, 420: Second mounting portion,
430: Third mounting portion, 431: Coolant pump accommodation space,
440: Vehicle mounting portion, 450: First coolant flow path,
451: First-first port, 452: First-second port, 453: First-third port,
454: First connection flow path, 460: Second coolant flow path,
461: Second-first port,
462: Second-second port, 463: Second-third port, 464: Second connection flow path,
510: First coolant pump, 511: Fastening portion, 520: Second coolant pump,
521: Fastening portion, 530: Fastening member, 610: First thermal management target component,
620: Second thermal management target component, 710: First heat radiator,
720: Second heat radiator

The invention claimed is:

1. A water supply module comprising:
a coolant module including a reservoir tank configured to accommodate a coolant therein, a direction switching valve configured to control a flow of the coolant in a plurality of directions, and a coolant pump configured to pump the coolant; and
a component assembling part to which the coolant module is configured to be coupled, the component assembling part having a vehicle mounting portion formed to be coupled to a vehicle, and a coolant flow path in which the coolant flows.

2. The water supply module of claim 1,
wherein the direction switching valve and the coolant pump are configured as a single assembly, and the component assembling part has a mounting portion to which the reservoir tank is coupled, and a mounting portion to which the assembly of the direction switching valve and the coolant pump is coupled.

3. The water supply module of claim 1,
wherein the water supply module further comprises one or more heat exchangers, and the component assembling part has a mounting portion to which the one or more heat exchangers are coupled.

4. The water supply module of claim 3,
wherein the component assembling part has a plurality of coolant ports assembled to the heat exchanger so that the coolant flows between the component assembling part and the heat exchanger.

5. The water supply module of claim 1,
wherein the water supply module further comprises a controller connected to the direction switching valve and configured to control an operation of the direction switching valve.

6. The water supply module of claim 1,
wherein the reservoir tank is disposed above the component assembling part based on a gravitational direction, and the vehicle mounting portion is disposed below the component assembling part based on the gravitational direction.

7. The water supply module of claim 1,
wherein the component assembling part has a reservoir tank accommodation space in which the reservoir tank is seated, and a coolant pump accommodation space in which the coolant pump is seated.

8. The water supply module of claim 1,
wherein the component assembling part comprises:
a first flat plate portion having the vehicle mounting portion; and
a second flat plate portion protruding from the first flat plate portion.

9. The water supply module of claim 8,
wherein the water supply module further comprises one or more heat exchangers, and the heat exchanger is disposed opposite to the direction switching valve and the coolant pump based on the second flat plate portion.

10. The water supply module of claim 8,
wherein the component assembling part has a first coolant flow path connected to a first-first port through a first connection flow path so that a first coolant flows through the first coolant flow path, and the component assembling part has a second coolant flow path connected to a second-first port through a second connection flow path so that a second coolant flows through the second coolant flow path.

11. The water supply module of claim 10, wherein imaginary planes defined by the first and second flat plate portions traverse the first and second coolant flow paths.

12. A water supply module comprising:
a component assembling part having a first mounting portion, a second mounting portion, a third mounting portion, and a vehicle mounting portion and having a coolant flow path in which a coolant flows;
a reservoir tank configured to accommodate the coolant therein and coupled to the first mounting portion;
a heat exchanger having a coolant flow path, in which the coolant flows, and connected to the coolant flow path of the component assembling part, the heat exchanger being coupled to the second mounting portion and having a refrigerant flow path configured to exchange heat with the coolant flow path; and
a direction switching valve connected to a coolant flow path of the reservoir tank and the coolant flow path of the heat exchanger, coupled to the third mounting portion, and configured to control a flow of the coolant in a plurality of directions.

13. The water supply module of claim 12,
wherein the first mounting portion, the second mounting portion, the third mounting portion, the vehicle mounting portion, and the coolant flow path of the component assembling part are integrally formed by injection molding.

14. The water supply module of claim 12,
wherein the first mounting portion is formed at an upper side of the component assembling part, the vehicle mounting portion is formed at a lower side of the component assembling part, the second mounting portion is formed at a rear side of the component assembling part, and the third mounting portion is formed at a front side of the component assembling part.

15. The water supply module of claim 12,
wherein the component assembling part has a through-groove formed through a partial region corresponding to a position on the heat exchanger and a position on the direction switching valve that face each other.

16. The water supply module of claim 12,
wherein the reservoir tank has first and second accommodation portions in which first and second coolants having different temperatures are separately accommodated, wherein the component assembling part has coolant flow paths through which the first and second coolants flow, wherein the heat exchanger has coolant flow paths through which the first and second coolants flow, and wherein the direction switching valve is configured to control flows of the first and second coolants in the plurality of directions.

17. The water supply module of claim 16, wherein the first and second coolants are configured to flow separately from being mixed with each other.

18. The water supply module of claim 16, further comprising:
   a first coolant pump integrally mounted on the direction switching valve and configured to pump the first coolant; and
   a second coolant pump configured to pump the second coolant.

19. The water supply module of claim 18,
wherein first and second accommodation portions of the reservoir tank are connected to the direction switching valve, first and second coolant flow paths of the heat exchanger are connected to the direction switching valve, and first and second coolant flow paths of the heat exchanger are connected to the coolant flow paths of the component assembling part.

20. The water supply module of claim 19,
wherein the direction switching valve has a first coolant discharge port from which the first coolant is discharged, and a second coolant discharge port from which the second coolant is discharged.

21. The water supply module of claim 19,
wherein a first coolant flow path of the component assembling part has a first-first port connected to the first coolant flow path of the heat exchanger, and a first-second port and a first-third port configured to communicate with the first-first port, and
wherein a second coolant flow path of the component assembling part has a second-first port connected to the second coolant flow path of the heat exchanger, and a second-second port and a second-third port configured to communicate with the second-first port.

* * * * *